ized (2013.01); *F02C 7/268*
(12) United States Patent
Mouze et al.

(10) Patent No.: US 9,988,987 B2
(45) Date of Patent: Jun. 5, 2018

(54) METHOD OF STARTING A TURBOMACHINE WHILE REDUCING THERMAL UNBALANCE

(75) Inventors: Yann Mouze, Limendous (FR); Frederic Ferdinand Jacques Batlle, Lons (FR); Edgar Haehner, Bordes (FR); Frederic Segura, Lescar (FR)

(73) Assignee: TURBOMECA, Bordes (FR)

( * ) Notice: Subject to any disclaimer, the term of this patent is extended or adjusted under 35 U.S.C. 154(b) by 685 days.

(21) Appl. No.: 14/131,851

(22) PCT Filed: Jun. 29, 2012

(86) PCT No.: PCT/FR2012/051508
§ 371 (c)(1),
(2), (4) Date: Jan. 9, 2014

(87) PCT Pub. No.: WO2013/007912
PCT Pub. Date: Jan. 17, 2013

(65) Prior Publication Data
US 2014/0123673 A1 May 8, 2014

(30) Foreign Application Priority Data
Jul. 12, 2011 (FR) .................................. 11 56342

(51) Int. Cl.
*F02C 7/26* (2006.01)
*F01D 19/02* (2006.01)
(Continued)

(52) U.S. Cl.
CPC ................ *F02C 7/26* (2013.01); *F01D 19/02*
(2013.01); *F02C 7/264* (2013.01); *F02C 7/268*
(2013.01);
(Continued)

(58) Field of Classification Search
CPC .. F02C 7/26; F02C 7/268; F02C 7/264; F01D
19/02; Y02T 50/671; F05D 2270/01;
F05D 2260/96; F05D 2260/85; F05D
2270/10
See application file for complete search history.

(56) References Cited

U.S. PATENT DOCUMENTS 8,245,517 B2 * 8/2012 Tong ....................... F01D 19/00
60/772
2010/0293961 A1 11/2010 Tong et al.
(Continued)

FOREIGN PATENT DOCUMENTS

EP 2 339 145 6/2011
JP 56-75909 A 6/1981

OTHER PUBLICATIONS

International Search Report dated Oct. 29, 2012 in PCT/FR12/051508 Filed Jun. 29, 2012.

*Primary Examiner* — Jun Yoo
(74) *Attorney, Agent, or Firm* — Oblon, McClelland, Maier & Neustadt, L.L.P.

(57) ABSTRACT

A method of starting a turbomachine, performed by an electronic unit, the turbomachine including a gas turbine engine including at least one rotor and a starter to drive the rotor in rotation, the method including: receiving an order to start the turbomachine, and executing in response to receiving the order to start: a primary acceleration during which the starter is operated to increase speed of rotation of the rotor; a thermal homogenization during which the starter is operated to keep the speed of rotation of the rotor constant or to decrease it until a predetermined condition is satisfied; after the predetermined condition is true, a secondary acceleration in which the starter is operated to increase the speed of rotation of the rotor; and an ignition in which ignition of the engine is ordered.

10 Claims, 2 Drawing Sheets

(51) Int. Cl.
*F02C 7/264* (2006.01)
*F02C 7/268* (2006.01)

(52) U.S. Cl.
CPC ...... *F05D 2260/85* (2013.01); *F05D 2260/96* (2013.01); *F05D 2270/01* (2013.01); *F05D 2270/10* (2013.01); *Y02T 50/671* (2013.01)

(56) References Cited

U.S. PATENT DOCUMENTS

2011/0146290 A1* 6/2011 Vernet .................... F01D 19/00
60/778
2011/0146291 A1* 6/2011 Snider .................... F01D 19/00
60/778

* cited by examiner

METHOD OF STARTING A TURBOMACHINE WHILE REDUCING THERMAL UNBALANCE

BACKGROUND OF THE INVENTION

The present invention relates to the general field of turbomachines. The present invention relates in particular to taking account of thermal unbalance when starting a turbomachine.

Thermal unbalance is a temporary unbalance that occurs in the rotor of a turbomachine after it has been stopped. Since hot air is lighter than cold air, temperature nonuniformities occur in the air-flow passage, which deform the rotor by a bimetallic effect. The thermal unbalance may be one hundred times greater than the residual unbalance of the rotor.

However, a turbomachine must pass through one or more critical speeds before reaching its operating speed. Thus, while restarting the turbomachine, on passing through critical speeds the thermal unbalance can give rise to strong vibration, which can degrade the reliability of the turbomachine. Thermal unbalance may also have the consequence of contact being made between the stator and the rotor, which can deteriorate the integrity of the components involved.

There are various known solutions that seek to reduce the undesirable effects of thermal unbalance:
  not restarting the turbomachine for a certain length of time after it has stopped;
  specific procedures performed while the engine is stopped or before it is restarted, for the purpose of reducing temperature nonuniformity (ventilation, successive rotations of the engine, injecting a stream of air into the air-flow passage, . . . );
  enlarging clearances between the stator and the rotor to prevent them making contact while restarting the turbomachine; and
  modifying the architecture of the engine in order to limit the effects of thermal unbalance.

Nevertheless, those known solutions present certain drawbacks:
  not restarting for a certain length of time penalizes the availability of the turbomachine;
  specific procedures require action to be taken by an operator, e.g. by the pilot for an aeroengine;
  enlarging clearances between the stator and the rotor is detrimental to the performance of the turbomachine; and
  adapting the architecture of the engine is detrimental to the weight of the turbomachine.

For example, Document FR 2 185 753 describes injecting compressed air into the air-flow passage, via a channel provided for that purpose. That document also mentions other solutions, in particular using turning gear to put the turbomachine into rotation before restarting it. That particular solution involves action being taken by an operator before restarting.

There therefore exists a need for a solution that is more effective when starting a turbomachine that might be suffering from thermal unbalance.

OBJECT AND SUMMARY OF THE INVENTION

The invention proposes satisfying this need by proposing a method of starting or restarting a turbomachine, the method being performed by an electronic unit, the turbomachine comprising a gas turbine engine including at least one rotor and a starter suitable for driving the rotor in rotation, the starting method comprising:
  a step of receiving an order to start the turbomachine, and in response to receiving the order to start:
  a primary acceleration step during which the starter is operated to increase the speed of rotation of the rotor;
  a thermal homogenization step during which the starter is operated to keep the speed of rotation of the rotor constant or to decrease it until a predetermined condition is satisfied;
  once the predetermined condition is true, a secondary acceleration step in which the starter is operated to increase the speed of rotation of the rotor; and
  an ignition step in which ignition of the engine is ordered.

Since the speed of rotation no longer increases after the primary acceleration step, the thermal unbalance does not produce unacceptable vibration during the primary acceleration step and the thermal homogenization step. Furthermore, during the thermal homogenization step, forced convective exchanges within the engine make temperatures uniform and therefore reduce the thermal unbalance. Thus, when the speed of rotation increases once more during the secondary acceleration state, the thermal unbalance is smaller and no longer generates unacceptable vibration.

Furthermore, the primary acceleration, thermal homogenization, and secondary acceleration steps are performed automatically by the electronic unit in response to receiving the order to start. In other words, the steps of the method of starting that enable the thermal unbalance to be reduced are incorporated in the process for starting the engine as managed by the electronic unit. Therefore, apart from issuing the order to start, an operator does not need to perform any other operation.

In an implementation, the primary acceleration step is performed until a predetermined speed of rotation is reached.

The predetermined speed of rotation may be less than a first critical speed of rotation of the turbomachine.

Because of the reduction in the thermal unbalance during the thermal homogenization step, the speed of rotation can subsequently exceed the predetermined speed of rotation during the secondary acceleration step.

In an implementation, the predetermined condition is a predetermined duration elapsing since the beginning of the thermal homogenization step.

By way of example, the predetermined duration lies in the range 5 seconds (s) to 60 s.

In another implementation, the primary acceleration step is performed until a level of vibration is detected that is greater than or equal to a first predetermined level, said predetermined condition being detecting a level of vibration that is less than or equal to a second predetermined level, itself less than the first predetermined level.

During the thermal homogenization step, it is possible to control the starter so as to keep the speed of rotation of the rotor constant.

In a variant, during the thermal homogenization step, the starter is operated to cease driving the rotor in rotation.

In corresponding manner, the invention also proposes:
  a computer program including instructions for performing a method of starting in accordance of the invention when the computer program is executed by a computer;
  an electronic unit including a memory in which there is stored a computer program in accordance with the invention; and a turbomachine comprising an electronic unit in accordance with the invention, a gas turbine engine including at least one rotor, and a starter suitable for driving the rotor in rotation.

BRIEF DESCRIPTION OF THE DRAWINGS

Other characteristics and advantages of the present invention appear from the following description made with reference to the accompanying drawings that show implementations having no limiting character. In the figures.

DETAILED DESCRIPTION OF THE INVENTION

Figure 1:
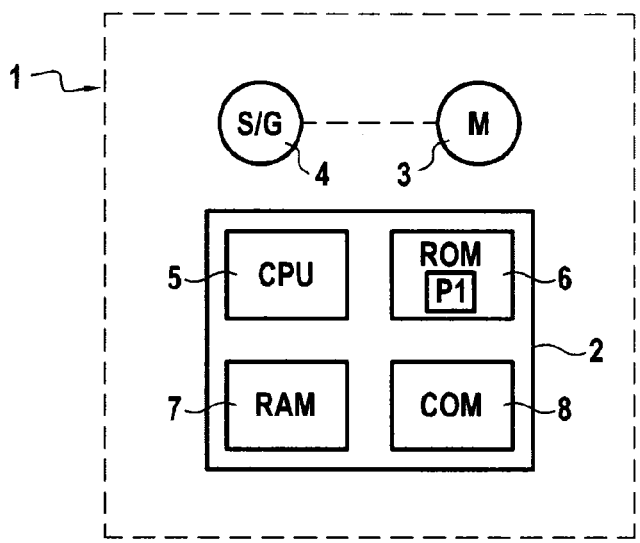
FIG. 1 is a diagram of a turbomachine in an embodiment of the invention.

FIG. 1 shows a turbomachine 1 that comprises an electronic unit 2, an engine 3, and a starter 4. In an embodiment of the invention, the turbomachine 1 is a helicopter turboshaft engine. This type of turboshaft engine is known to the person skilled in the art and it is therefore not described in detail. Nevertheless, the invention is applicable to other types of turbomachine for aircraft, in particular to a turbojet, to a two-spool bypass turbojet, to a turboprop, . . . , or else to industrial turbomachines, . . . .

The engine 3 is a gas turbine engine that includes at least one rotor. Below, the speed of rotation of the rotor is written N. In the above-mentioned situation of a two-spool bypass turbojet, the engine 3 has two rotors and N designates the speed of rotation of one of the two rotors.

By way of example, the starter 4 is an electric motor coupled to the engine 3 and capable of driving the engine 3 in rotation. The starter 4 may also act as an electricity generator when it is driven in rotation by the engine 3.

The electronic unit 2 controls the general operation of the turbomachine 1, in particular by running a main regulation loop for servo controlling the speed or the thrust of the turbomachine 1. The electronic unit 2 is typically of the type known to the person skilled in the art as a full authority digital engine control (FADEC) system or as an electronic engine controller (EEC).

The electronic unit 2 presents the hardware architecture of a computer and it comprises in particular a processor 5, a nonvolatile memory 6, a volatile memory 7, and an interface 8. The processor 5 serves to execute computer programs stored in the nonvolatile memory 6, while making use of the volatile memory 7 as working space. The interface 8 serves to acquire signals representative of the operation of the turbomachine 1 and to send control signals.

Thus, the electronic unit 2 may in particular acquire a signal representative of the speed of rotation N of the rotor, a signal representative of a level of vibration S in the engine 3, as delivered by a vibration sensor (e.g. an accelerometer), and a signal representative of a starting order DEM, e.g. as delivered by a control member that can be operated by an operator (the pilot for an aircraft turbomachine). Amongst other things, the electronic unit 2 may also control the starter 4 and the ignition of the engine 3.

Figure 2:
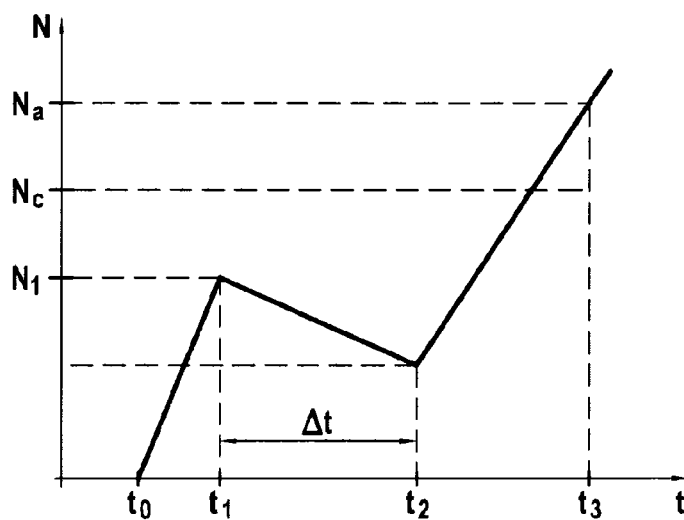
FIGS. 2 to 5 are graphs showing how the speed of rotation of the FIG. 1 turbomachine varies during starting as a function of time in several variant implementations of the invention.

With reference to FIG. 2, there follows a description of a first example of a method of starting the turbomachine 1. FIG. 2 is a graph showing how the speed of rotation N varies as a function of time $t$.

At the instant $t_0$, the electronic unit 2 receives an order to start the turbomachine 1. The electronic unit 2 then controls the starter 4 so as to cause it to drive the rotor and progressively increase its speed of rotation N until, at an instant $t_1$, it reaches a predetermined speed of rotation $N_1$. The speed of rotation $N_1$ is less than the first critical speed of rotation $N_c$ of the rotor.

Thereafter, the electronic unit 2 controls the starter 4 so that it ceases to drive the rotor for a predetermined duration $\Delta t$. By way of example, the predetermined duration $\Delta t$ lies in the range 5 s to 60 s. Because of aerodynamic power dissipation, the speed of rotation N decreases. During this predetermined duration, the forced convective exchanges in the engine 3 make temperatures more uniform and thus reduce thermal unbalance.

After the predetermined duration $\Delta t$ has elapsed, at an instant $t_2$, the electronic unit 2 controls the starter 4 so as to drive a rotor and progressively increase its speed of rotation N until it exceeds the speeds of rotation $N_1$ and $N_c$ and, at an instant $t_3$, reaches a predetermined speed of rotation $N_a$.

Thereafter, at the instant $t_3$, the electronic unit 2 orders ignition of the engine 3.

Between the instant $t_0$ and the instant $t_2$, the speed of rotation N is always less than or equal to the speed of rotation $N_1$, which itself is less than the speed of rotation $N_c$. Thus, the thermal unbalance does not give rise to unacceptable vibration. Furthermore, between the instants $t_1$ and $t_2$, the forced convective exchanges in the engine 3 make the temperatures more uniform and thus reduce the thermal unbalance. Thus, when the speed of rotation N increases from instant $t_2$, the thermal unbalance is reduced and likewise does not generate unacceptable vibration.

Figure 3:
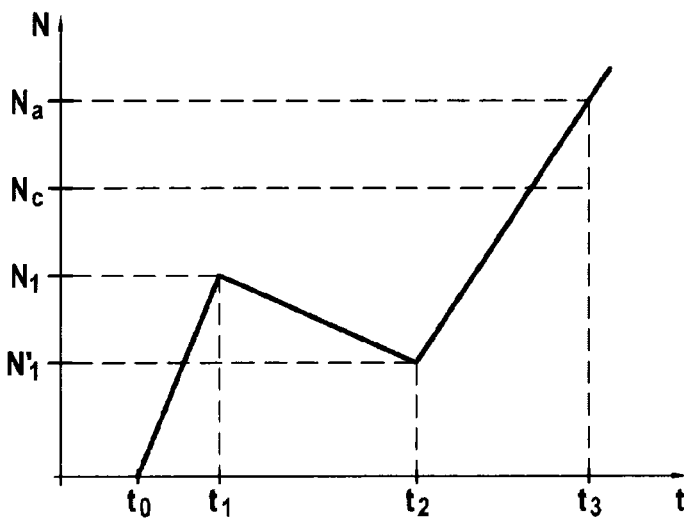

FIG. 3 is similar to FIG. 2 and shows a second example of a method of starting the turbomachine 1. This second example is similar to the first example of FIG. 2. It differs therefrom by the fact that after the instant $t_1$, the electronic unit 2 controls the starter 4 so that it ceases to drive the rotor until, at the instant $t_2$, it detects that the speed of rotation N is less than or equal to a predetermined speed of rotation $N_1'$. The speed $N_1'$ is less than the speed $N_1$. In other words, the instant $t_2$ is determined on the basis of a speed threshold and not on the basis of a predetermined duration elapsing.

Figure 4:
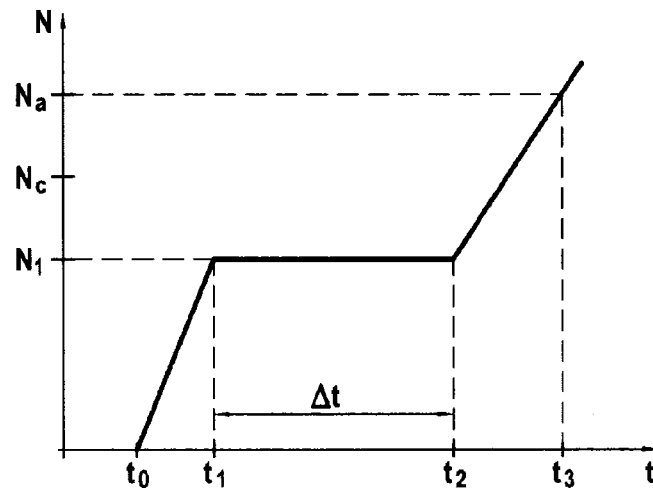

FIG. 4 is similar to FIG. 2 and shows a third example of a method of starting the turbomachine 1. This third example is similar to the first example of FIG. 2. It differs therefrom by the fact that during the predetermined duration $\Delta t$, i.e. between the instants $t_1$ and $t_2$, the electronic unit 2 controls the starter 4 in such a manner as to maintain the speed of rotation N constant and equal to $N_1$.

As in the examples of FIGS. 2 and 3, the speed of rotation N is limited prior to the instant $t_2$ and the thermal unbalance is reduced after the instant $t_2$ because of the forced convective exchanges in the engine 3. This avoids unacceptable vibration.

Figure 5:
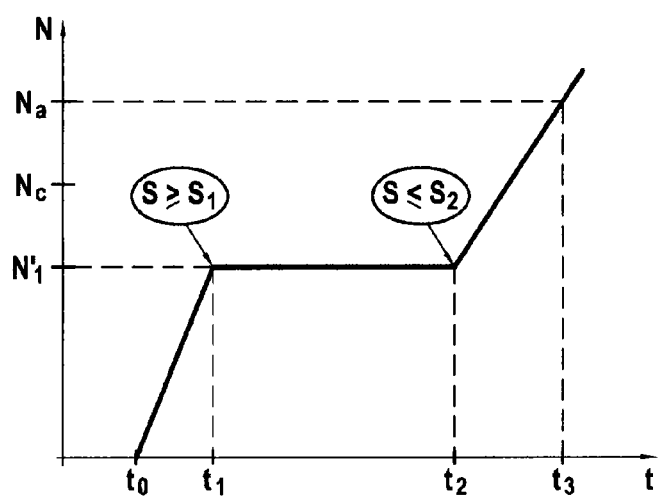

FIG. 5 is similar to FIG. 2 and shows how the speed of rotation N varies as a function of time t in a fourth example method of starting the turbomachine 1.

At the instant $t_0$, the electronic unit 2 receives an order to start the turbomachine 1. The electronic unit 2 then causes the starter 4 to drive the rotor and to increase its speed of rotation N progressively until, at the instant $t_1$, it detects a vibration level S that is greater than or equal to a predetermined threshold $S_1$. The speed of rotation N at the instant $t_1$ is written $N_1'$. An appropriate choice of the threshold $S_1$ makes it possible to ensure that $N_1'$ is less than the first critical speed of rotation $N_c$ of the rotor.

Thereafter, the electronic unit 2 controls the starter 4 so as to maintain the speed of rotation N constant and equal to $N_1'$ until, at an instant $t_2$, it detects that the vibration level S is less than or equal to a predetermined threshold $S_2$. The threshold $S_2$ is less than the threshold $S_1$.

Thereafter, the electronic unit 2 controls the starter 4 so as to drive a rotor and progressively increase its speed of rotation N until it exceeds the speeds of rotation $N_1'$ and $N_c$ and, at the instant $t_3$, reaches a predetermined speed of rotation $N_a$.

At the instant $t_3$, the electronic unit 2 then orders ignition of the engine 3.

The starting method of FIG. 5 is iterative. In other words, if after instant $t_2$ the threshold $S_1$ is reached again, then the electronic unit 2 controls the starter 4 once more so as to maintain the speed of rotation N constant and equal to $N_1'$, until it detects that the vibration level S is less than or equal to the threshold $S_2$.

As in the examples of FIGS. 2 to 4, the speed of rotation N is limited prior to the instant $t_2$ and the thermal unbalance is reduced after the instant $t_2$ because of the forced convective exchanges in the engine 3. This avoids unacceptable vibration.

Figure 6:
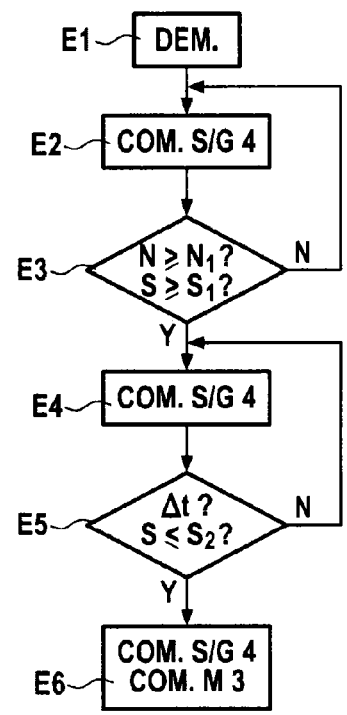
FIG. 6 is a flowchart showing the main steps of a starting method in an implementation of the invention.

The conduct of the starting method shown in FIGS. 2 to 5 may correspond to the processor 5 executing a computer program P1 stored in the nonvolatile memory 6. FIG. 6 shows the main steps of the starting method as performed by the electronic unit 2 when executing the computer program P1.

The starting method begins at step E1 during which the electronic unit 2 receives an order to start. The step E1 corresponds to the instant $t_0$ of FIGS. 2 to 4. The steps E2 to E6 that follow are performed in response to receiving the order to start.

At step E2, the electronic unit 2 controls the starter 4 so as to drive the rotor and progressively increase its speed of rotation N. At the step E3, the electronic unit 2 tests a condition for transition towards step E4. In the examples of FIGS. 2 to 4, the transition condition is $N \geq N_1$. In the example of FIG. 5, the transition condition is $S \geq S_1$. In another variant (not shown), the condition is that a predetermined duration has elapsed. The starting method loops back to step E2 as long as the transition condition is not true.

The steps E2 and E3 correspond to a primary acceleration step of a method of starting in accordance with the invention.

When the transition condition of step E3 is true, that corresponds to the instant $t_1$ of FIGS. 2 to 5, and the starting method continues with step E4. During the step E4, the electronic unit 2 controls the starter 4 so that it ceases to drive the rotor (examples of FIGS. 2 and 3) or so as to maintain a constant speed of rotation N (examples of FIGS. 4 and 5).

In step E5, the electronic unit 2 tests a predetermined condition. In the examples of FIGS. 2 and 4, the predetermined condition is that the predetermined duration $\Delta t$ has elapsed since the end of step E3. In the example of FIG. 3, the predetermined condition is $N \leq N_1'$. In the example of FIG. 5, the predetermined condition is $S \leq S_2$. The starting method loops back to the step E4 as long as the predetermined condition is not true.

Steps E4 and E5 correspond to a thermal homogenization step of a starting method in accordance with the invention.

When the transition condition of step E5 is true, that corresponds to the instant $t_2$ of FIGS. 2 to 4, and the starting method continues with step E6. During step E6, the electronic unit 2 controls the starter 4 so as to drive a rotor and progressively increase its speed of rotation N until it exceeds the speeds of rotation $N_1$ (or $N_1'$) and $N_c$ and, at the instant $t_3$, reaches a predetermined speed of rotation $N_a$. The electronic unit 2 then orders ignition of the engine 3, which involves injecting fuel and igniting it in the combustion chamber of the turbomachine.

Step E6 corresponds to a secondary acceleration step and to an ignition step of a starting method in accordance with the invention.

As explained above with reference to FIGS. 2 to 5, the starting method described makes it possible to avoid undesirable vibration that can be caused by thermal unbalance. There is no need to wait for a predetermined duration after the turbomachine 1 has stopped in order to restart the engine 3. The proposed solution does not require any specific architecture for the engine 3 nor does it require greater clearances between the stator and the rotor.

Furthermore, the steps E2 to E6 are performed by the electronic unit 2 automatically, in response to receiving the order to start in step E1. Therefore, apart from issuing the order to start, the pilot does not need to perform any other operation. Specifically, the steps E2 to E6 of the starting method are incorporated in the starting process of the engine 3 as managed by the electronic unit 2 while executing the computer program P1.

In a variant implementation, the steps E2 to E6 are performed other than by an electronic unit including a processor that executes a computer program. For example, the electronic unit may be a controller of the relay sequencer type configured to perform the steps E2 to E6 in response to receiving an order to start.

In an implementation, the steps E2 to E6 are preceded by a step of testing the thermal state of the turbomachine. Under such circumstances, if the thermal state of the turbomachine indicates the presence of a thermal unbalance, then the steps E2 to E6 are executed as described above. In contrast, if the thermal state indicates there is no thermal unbalance (cold engine), then the turbomachine is started without passing via the steps E2 to E6.

The invention claimed is:

1. A method of starting or restarting a turbomachine, performed by an electronic unit, the turbomachine including a gas turbine engine including at least one rotor and a starter configured to drive the rotor in rotation, the method comprising:
   determining a critical speed of the rotor at which the rotor generates unacceptable vibration when the rotor is thermally unbalanced;
   receiving an order to start;
   operating the starter to increase a speed of rotation of the rotor during a primary acceleration;
   operating the starter to keep the speed of rotation of the rotor constant or to decrease the speed of rotation of the rotor so as to thermally homogenize the rotor until a predetermined condition is satisfied, without ordering ignition of the engine, the speed of rotation of the rotor being less than the determined critical speed of the rotor;
   once the predetermined condition is true, operating the starter to increase the speed of rotation of the rotor greater than the determined critical speed of the rotor during a secondary acceleration; and ordering an ignition of the engine, the speed of rotation of the rotor being greater than the determined critical speed of the rotor when the ignition is ordered, wherein the method does not involve additional input made by an operator after the order to start is received.

2. A method of starting according to claim 1, wherein the primary acceleration is performed until a predetermined speed of rotation is reached.

3. A method of starting according to claim 1, wherein the predetermined condition is a predetermined duration elapsing from a beginning of the thermal homogenization.

4. A method of starting according to claim 1, wherein the primary acceleration is performed until a level of vibration is detected that is greater than or equal to a first predetermined level, the predetermined condition being detecting the level of vibration that is less than or equal to a second predetermined level, the second predetermined level being less than the first predetermined level.

5. A method of starting according to claim 1, wherein during the thermal homogenization, the starter is operated to keep the speed of rotation of the rotor constant.

6. A method of starting according to claim 1, wherein during the thermal homogenization, the starter is operated to cease driving the rotor in rotation.

7. A non-transitory computer readable medium including a computer program including instructions for performing a method of starting according to claim 1, when the computer program is executed by a computer.

8. An electronic unit comprising a memory storing the computer program according to claim 7.

9. A turbomachine comprising:
an electronic unit according to claim 8;
a gas turbine engine including at least one rotor; and
a starter configured to drive the rotor in rotation.

10. A method of starting according to claim 3, wherein the predetermined duration is between 5 seconds and 60 seconds.

* * * * *